United States Patent
Matsueda et al.

(10) Patent No.: US 8,361,925 B2
(45) Date of Patent: Jan. 29, 2013

(54) EXHAUST GAS-PURIFYING CATALYST

(75) Inventors: Satoshi Matsueda, Kakegawa (JP); Mareo Kimura, Kakegawa (JP); Hiroto Yoshida, Kakegawa (JP); Keiichi Narita, Kakegawa (JP); Hirohisa Tanaka, Ikeda (JP); Mari Uenisha, Ikeda (JP); Masashi Taniguchi, Ikeda (JP)

(73) Assignees: Cataler Corporation, Shizuoka (JP); Daihatsu Motor Co., Ltd., Osaka (JP)

( * ) Notice: Subject to any disclaimer, the term of this patent is extended or adjusted under 35 U.S.C. 154(b) by 133 days.

(21) Appl. No.: 12/765,693

(22) Filed: Apr. 22, 2010

(65) Prior Publication Data

US 2010/0204039 A1     Aug. 12, 2010

Related U.S. Application Data

(63) Continuation of application No. PCT/JP2008/068818, filed on Oct. 17, 2008.

(30) Foreign Application Priority Data

| Oct. 23, 2007 | (JP) | ................................. 2007-275433 |
| Oct. 23, 2007 | (JP) | ................................. 2007-275434 |
| Oct. 23, 2007 | (JP) | ................................. 2007-275435 |

(51) Int. Cl.
*B01J 23/00*  (2006.01)
*B01J 21/00*  (2006.01)
*B01J 29/00*  (2006.01)
*B01J 37/00*  (2006.01)

(52) U.S. Cl. ........ 502/326; 502/327; 502/333; 502/336; 502/338; 502/339; 502/355; 502/406; 502/415; 502/439; 502/524; 502/525

(58) Field of Classification Search .................. 502/326, 502/327, 333, 336, 338, 339, 355, 406, 415, 502/439, 524, 525
See application file for complete search history.

(56) References Cited

U.S. PATENT DOCUMENTS

| 4,049,583 | A | * | 9/1977 | Lauder | .......................... 502/303 |
| 4,089,810 | A | * | 5/1978 | Diwell et al. | ................. 502/302 |
| 4,110,251 | A | * | 8/1978 | Lauder et al. | ................. 502/225 |
| 4,261,862 | A | * | 4/1981 | Kinoshita et al. | ............. 502/304 |
| 4,274,981 | A | * | 6/1981 | Suzuki et al. | ................. 502/178 |
| 4,440,874 | A | * | 4/1984 | Thompson | .................... 502/327 |
| 4,742,038 | A | * | 5/1988 | Matsumoto | ................... 502/303 |
| 4,820,678 | A | * | 4/1989 | Xu | ................................ 502/303 |

(Continued)

FOREIGN PATENT DOCUMENTS

| JP | 1-242149 | 9/1989 |
| JP | 6-75675 | 9/1994 |

(Continued)

OTHER PUBLICATIONS

International Search Report for PCT/JP2008/068818, mailed Jan. 20, 2009.

(Continued)

*Primary Examiner* — Cam N. Nguyen
(74) *Attorney, Agent, or Firm* — John P. White; Cooper & Dunham LLP

(57) ABSTRACT

The exhaust gas-purifying catalyst includes at least one of a first composite oxide represented by a formula $A(Al_{2-x}B_x)O_4$ and a second composite oxide represented by a formula $(Al_{2-y}C_y)O_3$, wherein element A is a divalent transition metal other than platinum-group elements, each of elements B and C is a transition metal other than platinum-group elements, x satisfies $0<x<2$, and y satisfies $0<y<2$.

8 Claims, 4 Drawing Sheets

U.S. PATENT DOCUMENTS

| | | | |
|---|---|---|---|
| 4,985,387 A * | 1/1991 | Prigent et al. | 502/304 |
| 5,116,801 A * | 5/1992 | Luck | 502/307 |
| 5,185,311 A * | 2/1993 | Tabata et al. | 502/304 |
| 5,204,309 A * | 4/1993 | Vorob'iev et al. | 502/306 |
| 5,565,181 A * | 10/1996 | Dieckmann et al. | 423/239.1 |
| 5,728,643 A * | 3/1998 | Naitoh et al. | 502/302 |
| 5,736,114 A * | 4/1998 | Barthe et al. | 423/213.2 |
| 5,883,041 A * | 3/1999 | Pak et al. | 502/524 |
| 5,899,679 A * | 5/1999 | Euzen et al. | 431/7 |
| 6,060,420 A * | 5/2000 | Munakata et al. | 502/302 |
| 6,064,420 A * | 5/2000 | Harrison et al. | 725/136 |
| 6,069,111 A | 5/2000 | Yamamoto et al. | |
| 6,153,161 A * | 11/2000 | Fetzer et al. | 423/239.1 |
| 6,218,335 B1 * | 4/2001 | Okada et al. | 502/340 |
| 6,395,244 B1 * | 5/2002 | Hartweg et al. | 423/239.1 |
| 6,471,921 B1 * | 10/2002 | Van Calcar et al. | 422/239 |
| 6,524,996 B1 * | 2/2003 | Bender et al. | 502/346 |
| 6,569,803 B2 * | 5/2003 | Takeuchi | 502/328 |
| 6,846,471 B2 * | 1/2005 | Hotta et al. | 423/239.1 |
| 7,347,887 B2 * | 3/2008 | Bulow et al. | 95/138 |
| 7,381,394 B2 * | 6/2008 | Tanaka et al. | 423/593.1 |
| 7,504,085 B2 * | 3/2009 | Yang | 423/600 |
| 7,514,055 B2 * | 4/2009 | Golden | 423/213.2 |
| 7,622,418 B2 * | 11/2009 | Tanaka et al. | 502/325 |
| 7,700,519 B2 * | 4/2010 | Nirisen et al. | 502/332 |
| 7,754,650 B2 * | 7/2010 | Liu et al. | 502/304 |

FOREIGN PATENT DOCUMENTS

| | | |
|---|---|---|
| JP | 8-323205 | 12/1996 |
| JP | 10-202101 | 8/1998 |
| JP | 2003-93878 | 4/2003 |
| JP | 2004-41866 | 2/2004 |
| JP | 2004-41867 | 2/2004 |
| JP | 2004-41868 | 2/2004 |
| WO | WO-2007/113981 | 10/2007 |

OTHER PUBLICATIONS

International Preliminary Report on Patentability mailed Jun. 10, 2010, for PCT Application No. PCT/JP2008/068818, filed Oct. 17, 2008, English Translation, seven pages.

* cited by examiner

Lean
$(Al,Fe,Pd)_2O_3$

Rich
$(Al,Fe)_2O_3 + Pd$

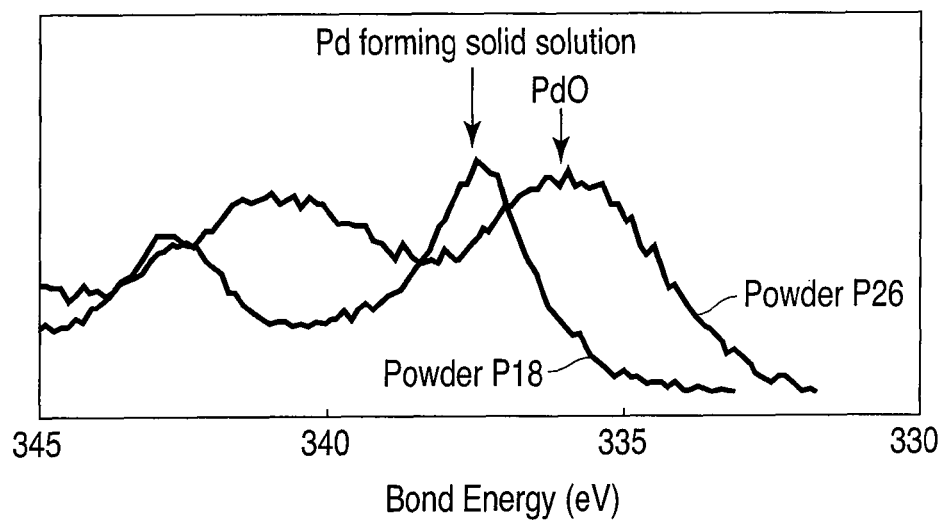
F I G. 7
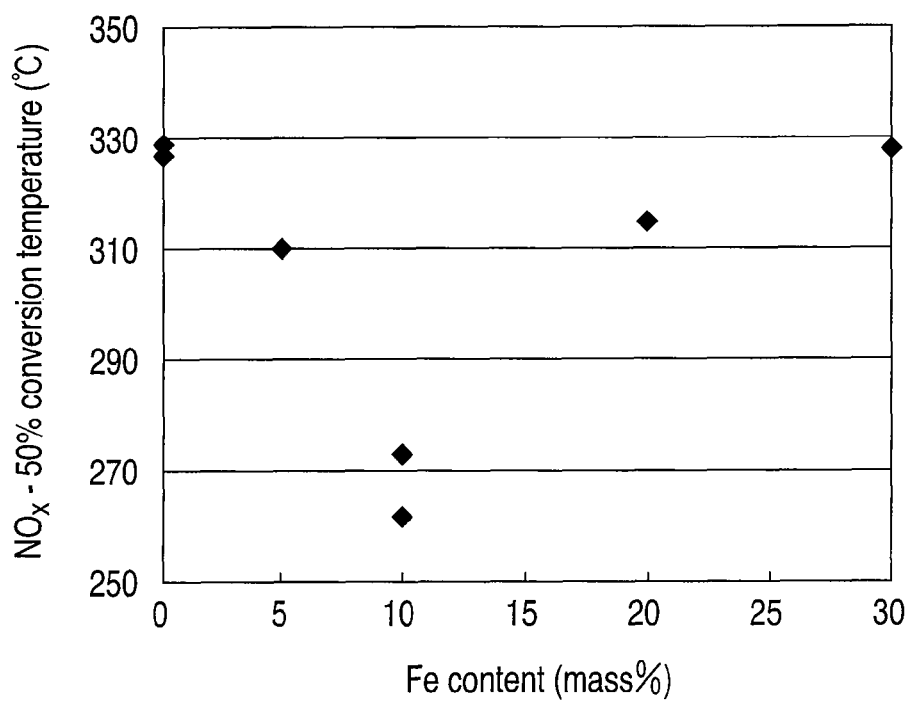
F I G. 8

US 8,361,925 B2

EXHAUST GAS-PURIFYING CATALYST

CROSS-REFERENCE TO RELATED APPLICATIONS

This is a Continuation Application of PCT Application No. PCT/JP2008/068818, filed Oct. 17, 2008, which was published under PCT Article 21(2) in Japanese.

This application is based upon and claims the benefit of priority from prior Japanese Patent Applications No. 2007-275433, filed Oct. 23, 2007; No. 2007-275434, filed Oct. 23, 2007; and No. 2007-275435, filed Oct. 23, 2007, the entire contents of all of which are incorporated herein by reference.

BACKGROUND OF THE INVENTION

1. Field of the Invention

The present invention relates to exhaust gas purification techniques.

2. Description of the Related Art

Exhaust gas-purifying catalysts for treating exhaust gas emitted from automobiles and the like conventionally contain a precious metal such as a platinum-group element (see, for example, Jpn. Pat. Appln. KOKAI Publication No. 1-242149, Jpn. Pat. Appln. KOKOKU Publication No. 6-75675, and Jpn. Pat. Appln. KOKAI Publication Nos. 10-202101, 2004-041866, 2004-041867, and 2004-041868). The precious metal plays a role as a catalytically active component which promotes a nitrogen oxide ($NO_x$) reduction reaction, and a hydrocarbon (HC) and carbon monoxide (CO) oxidation reaction, and the like.

However, precious metals are expensive and rare, and therefore, the composition of exhaust gas-purifying catalysts should preferably be free of precious metals. Yet, it has been considered very difficult to achieve sufficient exhaust gas purification performance with no precious metal or a small amount of a precious metal.

Exhaust gas-purifying catalysts are often used at high temperature under such conditions that the oxygen concentration changes relatively frequently. Therefore, when exhaust gas-purifying catalysts contain precious metals, the catalytic activity can easily be decreased by grain growth of the precious metals. Accordingly, improving the durability has become a significant challenge to exhaust gas-purifying catalysts containing precious metals.

To suppress the decrease in catalytic activity, for example, there has been developed an exhaust gas-purifying catalyst in which palladium forms a solid solution in a perovskite-type composite oxide (see, for example, Jpn. Pat. Appln. KOKAI Publication Nos. 2004-041866, 2004-041867, and 2004-041868). This catalyst allows palladium in the composite oxide to repeat precipitation and solid solution formation in response to the change in the oxygen concentration of exhaust gas, thereby suppressing grain growth of palladium.

However, the perovskite-type composite oxide is relatively low in heat resistance. Therefore, when used at high temperature for a long time, such a catalyst may suffer reduced self-regenerating capability, which is achieved by the precipitation and solid solution formation of palladium. In some cases, therefore, such a catalyst cannot achieve high exhaust gas purification performance after an endurance test.

BRIEF SUMMARY OF THE INVENTION

A first object of the invention is to achieve an exhaust gas-purifying catalyst that offers high exhaust gas purification performance even when it contains no precious metal or low content of the precious metal.

A second object of the invention is to provide an exhaust gas-purifying catalyst that has high catalytic activity even after an endurance test.

According to an aspect of the present invention, there is provided an exhaust gas-purifying catalyst, comprising at least one of a first composite oxide represented by a formula $A(Al_2-xB_x)O_4$ and a second composite oxide represented by a formula $(Al_{2-y}C_y)O_3$, wherein element A is a divalent transition metal other than platinum-group elements, each of elements B and C is a transition metal other than platinum-group elements, x satisfies $0<x<2$, and y satisfies $0<y<2$.

BRIEF DESCRIPTION OF THE SEVERAL VIEWS OF THE DRAWING

FIG. 7 is a graph showing an example of the result of measurement by XPS.

FIG. 8 is a graph showing an example of the relationship between the iron content and the $NO_x$ 50% conversion temperature.

DETAILED DESCRIPTION OF THE INVENTION

Figure 1:
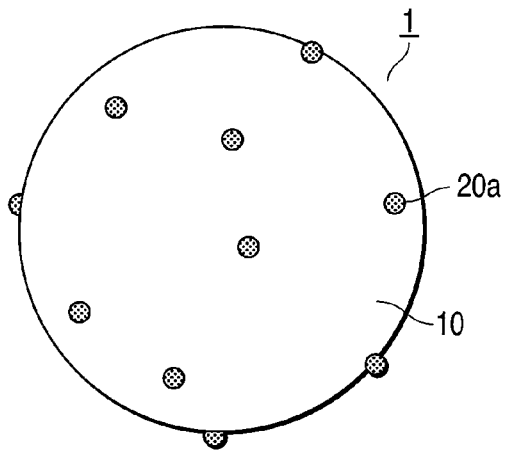
FIG. 1 schematically shows an example of the exhaust gas-purifying catalyst according to an aspect of the invention.

Some aspects of the invention will be described below with reference to the drawings. In the drawings, elements that are the same or similar in function are given the same reference characters, and their description will not be repeated. As used herein, the term "composite oxide" means not a mere physical mixture of two or more oxides but a material comprising two or more oxides that form a solid solution.

The exhaust gas-purifying catalyst according to a first aspect of the invention comprises at least one of a first composite oxide represented by the formula $A(Al_{2-x}B_x)O_4$ ($0<x<2$) and a second composite oxide represented by the formula $(Al_{2-y}C_y)O_3$ ($0<y<2$).

The first composite oxide has, for example, a spinel structure.

Element A is a divalent transition metal other than platinum group elements. As such, use can be made of the elements having an outermost shell electron in the 3d orbital, such as iron, cobalt, nickel, and manganese. Typically, element A includes iron. For example, element A is iron or a combination of iron and other divalent transition metal.

Element B is a transition metal other than platinum group elements. Element B is, for example, a divalent transition metal, a trivalent transition metal, or a combination thereof. As such, use can be made of the elements having an outermost shell electron in the 3d orbital, such as iron, cobalt, nickel, and manganese. Typically, element B includes iron. For example, element B is iron or a combination of iron and other transition metal. Element B may be the same as or different from element A.

Note that the first composite oxide may be partially oxygen-deficient.

The second composite oxide is a compound in which element C forms a solid solution in alumina. The second composite oxide is, for example, in the same form as γ-, δ-, θ-, α-, or κ-alumina.

As element C in the second composite oxide, the same transition metal as stated above for element B in the first composite oxide may be used. When the exhaust gas-purifying catalyst comprises both the first and second composite oxides, element C may be the same as or different from element B. In this case, element C may also be the same as or different from element A.

Note that the second composite oxide may be partially oxygen-deficient.

The amount of elements A, B and C is typically from 3% by mass to 55% by mass, preferably from 5% by mass to 20% by mass, more preferably from 5% by mass to 15% by mass of the total amount of the first and second composite oxides. If this amount is small, sufficient catalytic activity cannot be obtained in some cases. If this amount is too large, the composite oxide may have reduced heat resistance.

When the first composite oxide and/or the second composite oxide contains iron, the amount of divalent iron is typically 30 atomic percent (at. %) or more, preferably 40 at. % or more, of the total amount of iron in the first composite oxide and/or the second composite oxide. If the content of divalent ion is small, sufficient catalytic activity cannot be obtained in some cases.

In the exhaust gas-purifying catalyst, the transition metal, specifically the divalent iron is considered to play a role as a catalytically active component. Therefore, the exhaust gas-purifying catalyst can offer high exhaust gas purification performance, specifically high $NO_x$ reduction performance, even when containing no precious metal. Note that, although the exhaust gas-purifying catalyst is basically free of precious metals, it may further comprise a precious metal. For example, if sufficient exhaust gas purification performance, specifically sufficient HC and CO removal performance is not obtained using only the transition metal, specifically using only divalent iron as the catalytically active component, a small amount of a precious metal may be used so that sufficient performance can be achieved.

The exhaust gas-purifying catalyst may comprise both the first and second composite oxides. Alternatively, the exhaust gas-purifying catalyst may comprise only one of the first and second composite oxides.

The exhaust gas-purifying catalyst is typically produced by the method described below.

First, alumina powder is introduced into an aqueous solution of a compound of element A, that of a compound of element B, and/or that of a compound of element C, and then dried. The resulting powder is baked in an oxidizing atmosphere for a specific time and then baked in a reducing atmosphere for a specific time. As a result, a composite oxide containing a transition metal is obtained.

There is no particular limitation on methods for producing the composite oxide. For example, a co-precipitation method, a citric acid complex method, an alkoxide method, or the like may be used instead of the above-mentioned impregnation method.

The baked powder is then subjected to compression molding, and the molded product is optionally crushed. As a result, the exhaust gas-purifying catalyst is obtained in the form of pellets.

In this method, the baking temperature is, for example, in the range of about 700 to about 900° C. If the baking temperature is low, it may be difficult to produce a composite oxide. If the baking temperature is high, the specific surface area of the composite oxide may be reduced, so that high activity cannot be obtained in some cases.

Next, a description will be given of a second aspect of the invention.

The exhaust gas-purifying catalyst according to the second aspect of the invention comprises at least one of the first and second composite oxides and a third composite oxide represented by the formula $D_iO_j \cdot p(E_{2-z}Fe_zO_3)$. In other words, the exhaust gas-purifying catalyst has the same composition as the exhaust gas-purifying catalyst according to the first aspect, except that it further comprises the third composite oxide.

Element D is at least one element selected from a monovalent element, a divalent element, and a rare-earth element. Element D is typically an element other than a platinum-group element.

Examples of the monovalent element that may be used include alkali metals such as lithium, sodium and potassium.

Examples of the divalent element that may be used include beryllium, magnesium, alkaline-earth metals such as calcium and barium, and divalent transition metals other than iron, such as cobalt, nickel, copper, and zinc.

Examples of the rare-earth element that may be used include scandium, yttrium, lanthanum, cerium, praseodymium, neodymium, promethium, samarium, europium, gadolinium, terbium, dysprosium, holmium, erbium, thulium, ytterbium, and lutetium.

Typically, element D includes a divalent element, specifically magnesium. For example, element D is magnesium, a combination of magnesium and other divalent element, or a combination of magnesium and a monovalent element.

Element E is aluminum or a combination of aluminum and a transition metal. The transition metal is typically an element other than platinum-group element. Examples of the transition metal that may be used include titanium, vanadium, chromium, manganese, cobalt, nickel, copper, and zinc. Element E may comprise two or more transition metals.

In the formula, p satisfies the relationship $1 \leq p \leq 6$ and represents the molar ratio between the component represented by the formula $D_iO_j$ and the component represented by the formula $E_{2-z}F_zO_3$ in the third composite oxide. Typically, p is 1 or 6 (p=1 or 6).

When p is 1 (p=1), the third composite oxide has, for example, a spinel crystal phase.

When p is 6 (p=6), the third composite oxide contains, for example, at least one of a hexaaluminate crystal phase, a magnetoplumbite crystal phase, and a beta-alumina crystal phase.

The third composite oxide may be a mixture of two or more composite oxides different in the number p. For example, the third composite oxide may be a mixture of a composite oxide represented by the formula in which p is 1 (p=1) and another composite oxide represented by the formula in which p is 6 (p=6).

In the formula, i and j are numbers that satisfy the relationship ki=2j, wherein k is the valence of element D. For example, when element D is a divalent element (k=2), (i,j) is (1,1) ((i,j)=(1,1)).

In the formula, z satisfies the relationship 0<z<2. In other words, the third composite oxide contains both element E and iron as essential components.

As described, various compounds may be used as the third composite oxide. Specific examples of the third composite oxide include $MgO\cdot(Al_{1.96}Fe_{0.04}O_3)$, $MgO\cdot(Al_{1.60}Fe_{0.40}O_3)$, $MgO\cdot(Al_{1.00}Fe_{1.00}O_3)$, $SrO\cdot(Al_{1.60}Fe_{0.40}O_3)$, $CoO\cdot(Al_{1.60}Fe_{0.40}O_3)$, and $NiO\cdot(Al_{1.00}Fe_{1.00}O_3)$.

Note that the third composite oxide may be partially oxygen-deficient. Specifically, for example, when element E is a trivalent element, at least part of the iron may be divalent.

In the third composite oxide, iron is considered to play a role as a catalytically active component. In addition, the third composite oxide can offer high exhaust gas purification performance, specifically high HC and CO oxidation performance, even when containing no platinum-group element.

When the third composite oxide is exposed to a high-temperature and reducing atmosphere, iron particles are precipitated from the composite oxide. When the third composite oxide is then exposed to a high-temperature and oxidizing atmosphere, the iron particles form a solid solution with the composite oxide. In automotive vehicles, the oxygen concentration of the exhaust gas changes relatively frequently. Therefore, even after long-term use at high temperature, the decrease in catalytic activity due to iron particle growth is less likely to occur. Thus, the third composite oxide can show high catalytic activity even after an endurance test.

Note that, although the exhaust gas-purifying catalyst is basically free of precious metals, it may further comprise a small amount of a precious metal.

When the $NO_x$ reduction performance is particularly important, the mass ratio between the first and/or second composite oxide and the third composite oxide is typically in the range of 70:30 to 95:5. When the HC and CO oxidation performance is particularly important, the mass ratio is typically in the range of 5:95 to 30:70. When the balance between the $NO_x$ reduction performance and the HC and CO oxidation performance is particularly important, the mass ratio is typically in the range of 30:70 to 70:30.

The exhaust gas-purifying catalyst is produced, for example, by the method described below.

First, the first and/or second composite oxide is produced. The first and/or second composite oxide may be produced by the same method as described above for the first embodiment.

The third composite oxide is then produced. The third composite oxide is produced, for example, as described below.

First, an aqueous solution of a compound of element D, a compound of element E, and a compound of iron is prepared. A neutralizer is then added to the aqueous solution so that a co-precipitate is produced. Subsequently, the resulting co-precipitate is subjected to drying and heat treatment. As a result, the third composite oxide is obtained.

In this method, the heat treatment temperature is, for example, from about 500 to about 1400° C., and particularly from about 800 to about 1200° C. If the heat treatment temperature is low, it may be difficult to produce the third composite oxide. If the heat treatment temperature is high, the specific surface area of the third composite oxide may be reduced, so that high activity cannot be obtained in some cases.

In this process, an impregnation method, a citric acid complex method, an alkoxide method, or the like may be used instead of the above co-precipitation method.

The resulting third composite oxide and the first and/or second composite oxide are used to form the exhaust gas-purifying catalyst. For example, the third composite oxide and the first and/or second composite oxide are uniformly mixed using a mortar or the like. Thereafter, the mixture is subjected to compression molding, and the molded product is optionally crushed. As a result, the exhaust gas-purifying catalyst is obtained in the form of pellets.

Next, a description will be given of a third aspect of the invention.

FIG. 1 schematically shows an example of the exhaust gas-purifying catalyst according to an aspect of the invention. The exhaust gas-purifying catalyst 1 is a pellet catalyst formed by aggregation of particles. FIG. 1 illustrates single particle of the pellet catalyst.

The exhaust gas-purifying catalyst 1 comprises a carrier 10 and palladium.

The carrier 10 comprises a fourth composite oxide represented by the formula $(Al_{2-w}M_w)O_3$ (0<w<2).

The fourth composite oxide is typically in the same form as γ-, δ-, θ-, α-, or κ-alumina. The fourth composite oxide may be partially oxygen-deficient.

Element M is a transition metal capable of being both divalent and trivalent. As such, use can be made of, for example, elements having an outermost shell electron in the 3d orbital, such as iron, cobalt, nickel, and manganese. Typically, element M includes iron. For example, element M is iron or a combination of iron and one or more elements having an outermost shell electron in the 3d orbital. When the same element as element C is used as element M, the fourth composite oxide is the same as the second composite oxide.

The carrier 10 may further comprise a fifth composite oxide represented by the formula $MAl_2O_4$ and having a spinel structure. Element M in the fifth composite oxide is the same as the element M in the fourth composite oxide. The fifth composite oxide may be partially oxygen-deficient.

A part of the palladium forms a solid solution with the fourth composite oxide. Another part of the palladium forms catalytic metal particles 20a. These catalytic metal particles 20a are supported by the carrier 10. When the carrier 10 contains the fifth composite oxide, a further part of the palladium and the fifth composite oxide may form a solid solution.

The exhaust gas-purifying catalyst 1 exhibits a reversible state-change, when the composition of the atmosphere around it is changed at high temperature. This will be described with reference to FIG. 2.

Figure 2:
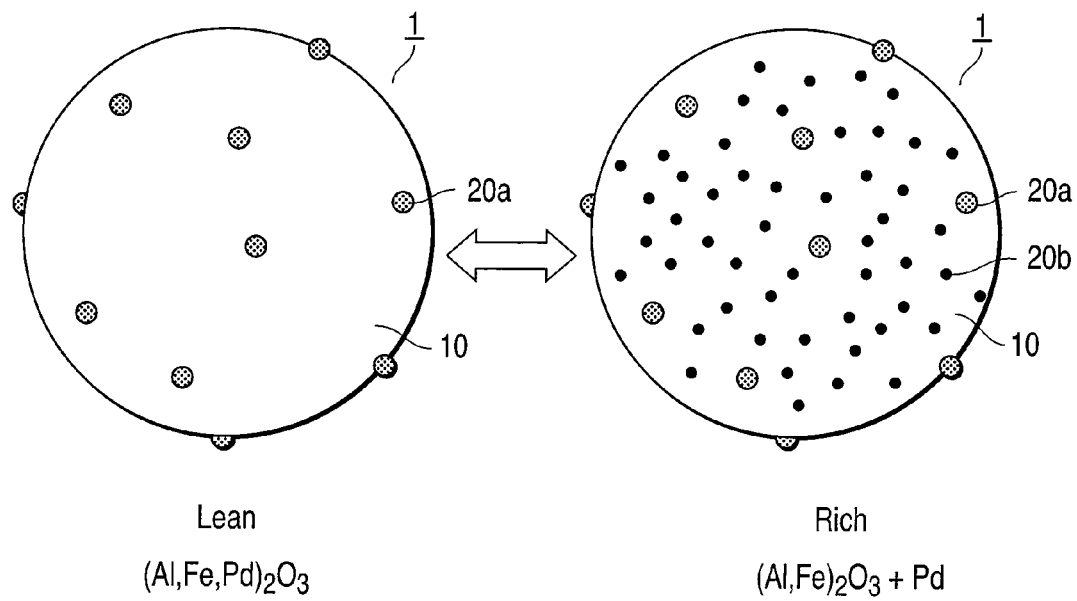
FIG. 2 is a conceptual diagram schematically showing a state change of the exhaust gas-purifying catalyst in FIG. 1 at high temperature conditions.

FIG. 2 is a conceptual diagram schematically showing a state change of the exhaust gas-purifying catalyst in FIG. 1 at high temperature conditions. In FIG. 2, the state referred to as "lean" is the state of the exhaust gas-purifying catalyst 1 when it is exposed to a high-oxygen atmosphere at high temperature, such as when the supply of fuel to the engine is stopped. On the other hand, the state referred to as "rich" is the state of the exhaust gas-purifying catalyst 1 when it is exposed to a low-oxygen atmosphere at high temperature, such as when a large amount of fuel is continuously supplied to the engine.

The lean state in FIG. 2 corresponds to the state that has been described with reference to FIG. 1. However, it should be noted that there is a possibility that, at this time, at least part of the catalytic metal particles 20a may be oxidized.

In this state, the catalytic metal particles 20a mainly contribute to the activity of the exhaust gas-purifying catalyst 1, while palladium in the carrier 10 negligibly contributes to the activity. However, while the exhaust gas-purifying catalyst 1 is in the lean state, the concentration of harmful components (such as $NO_x$, HC and CO) in the exhaust gas, namely, the concentration of harmful components in the atmosphere is relatively low. Therefore, the exhaust gas-purifying catalyst 1 offers sufficient performance.

When the oxygen content of the atmosphere at high temperature becomes low, the exhaust gas-purifying catalyst 1 changes from the lean state to the rich. Specifically, palladium is precipitated from the carrier 10, and the precipitated palladium forms catalytic metal particles 20b on the surface of the carrier 10.

When the exhaust gas-purifying catalyst 1 is in the rich state, the concentration of harmful components in the exhaust gas is relatively high. Therefore, while the rich state is maintained, the exhaust gas-purifying catalyst 1 is required to have higher activity than that required while the lean state is maintained.

The catalytic metal particles 20b are much smaller than the catalytic metal particles 20a. Therefore, the exhaust gas-purifying catalyst 1 in the rich state has higher activity than the exhaust gas-purifying catalyst 1 in the lean state. Thus, the exhaust gas-purifying catalyst 1 offers sufficient performance, even when the concentration of harmful components in the exhaust gas is high.

As the oxygen concentration of the atmosphere increases at high temperature, the exhaust gas-purifying catalyst 1 in the rich state changes to the lean state. Therefore, the palladium forming the catalytic metal particles 20b and the oxide constituting the carrier 10 form a solid solution.

As described, the exhaust gas-purifying catalyst 1 produces a reversible state-change. In addition, the exhaust gas-purifying catalyst 1 forms very fine catalytic metal particles 20b on the surface of the carrier 10 every time it changes from the lean state to the rich. Therefore, the state is recovered by the change from the rich state to the lean and vice versa. Thus, palladium in the exhaust gas-purifying catalyst 1 has a self-regenerating capability. In automotive vehicles, the oxygen concentration of the exhaust gas relatively frequently changes. In automotive vehicles, therefore, the exhaust gas-purifying catalyst 1 constantly has high activity and offers sufficient performance, when exposed to a high-temperature and low-oxygen atmosphere.

In the exhaust gas-purifying catalyst 1, the catalytic metal particles 20a contribute to the activity of the exhaust gas-purifying catalyst 1 regardless of the composition or temperature of the atmosphere. Therefore, the exhaust gas-purifying catalyst 1 offers sufficient performance not only when exposed to a high-temperature and high-oxygen atmosphere but also during initial operation or at low temperature.

As mentioned above, perovskite-type composite oxides are relatively low in heat resistance. Therefore, an exhaust gas-purifying catalyst containing a perovskite-type composite oxide as a carrier may suffer reduced catalytic activity when used at high temperature for a long time.

An carrier comprising alumina has heat resistance higher than that of a carrier comprising perovskite-type composite oxide. However, alumina does not tend to form a solid solution with palladium, and, when alumina is used, it is difficult to impart a self-regenerating capability to palladium.

In contrast, the carrier 10 comprises the fourth composite oxide represented by the formula $(Al_{2-w}M_w)O_3$ ($0<w<2$), namely, a compound in which element M and alumina form a solid solution.

Element M is a transition metal capable of being either divalent or trivalent. Therefore, the composite oxide containing element M more easily loses a charge balance than alumina, and therefore, it is relatively easy to control the valence of the composite oxide containing element M. Thus, palladium can form a solid solution more easily in the composite oxide containing element M than in alumina, and palladium can repeat precipitation and solid solution formation more easily. In addition, this composite oxide has high heat resistance as alumina. Therefore, the use of the carrier 10 described above makes it possible to impart a self-regenerating capability to palladium and to achieve high durability.

The content of element M in the exhaust gas-purifying catalyst 1 is, for example, from 0.1% by mass to 30% by mass, preferably from 1% by mass to 20% by mass, more preferably from 2% by mass to 15% by mass, based on the mass of alumina. If the content of element M is low, it may be difficult to form a solid solution of palladium and the carrier 10. If the content of element M is too high, heat resistance of the carrier 10 may be lowered.

The palladium content of the exhaust gas-purifying catalyst 1 is, for example, from 0.01% by mass to 10% by mass, preferably from 0.1% by mass to 5% by mass, based on the mass of alumina and element M. If the palladium content is low, sufficient catalytic activity cannot be obtained in some cases. If the palladium content is high, sintering of a precious metal may easily occur in some cases.

The percentage of palladium forming a solid solution in the total palladium supported by the exhaust gas-purifying catalyst 1 (hereinafter referred to as a "solid-solution forming ratio") is, for example, from 10 to 90%, preferably from 30 to 90%, and more preferably from 50 to 90%. If the solid-solution forming ratio is low, the effect of suppressing the decrease in activity due to sintering of precious metals may be insufficient. If the solid-solution forming ratio is high, the initial activity may be insufficient.

The exhaust gas-purifying catalyst 1 is produced, for example, by the method described below.

First, alumina powder is introduced into an aqueous solution of a compound of element M, where M is, for instance, iron. The powder is then dried and baked so that powder of alumina forming a solid solution with element is obtained.

Any method may be used to form a solid solution of element M and alumina powder. For example, a co-precipitation method, a citric acid complex method, an alkoxide method, or the like may be used instead of the above impregnation method.

The powder is then introduced into an aqueous solution of a palladium compound. The powder is then dried and baked so that a powder of a solid solution comprising alumina, element M, and a part of the palladium is obtained.

The baked powder is then subjected to compression molding, and the molded product is optionally crushed. As a result, the exhaust gas-purifying catalyst 1 is obtained in the form of pellets.

In this method, the baking temperature is, for example, in the range of about 700 to about 900° C. If the baking temperature is low, it may be difficult to produce the carrier 10, and it may be difficult to form a solid solution of palladium and the carrier 10. If the baking temperature is high, the specific surface area of the carrier 10 may be reduced, so that it may be difficult to well disperse the catalytic metal particles 20a on the carrier 10. In some cases, therefore, high activity cannot be obtained.

While some aspects where the exhaust gas-purifying catalyst is a pellet catalyst have been described above, the exhaust gas-purifying catalyst may be in various forms. For example, the exhaust gas-purifying catalyst may be a monolithic catalyst.

EXAMPLES

Some examples of the invention are described below, which are not intended to limit the scope of the invention.

Example 1

Preparation of Catalyst C1

Commercially available γ-alumina powder having a specific surface area of 160 m$^2$/g was introduced into an aqueous iron nitrate solution containing 10% by mass of iron based on the amount of the alumina. The powder was then dried at 120° C. while stirring. The powder was then baked at 800° C. in air for 1 hour and subsequently baked at 800° C. for 30 minutes in a reducing atmosphere containing 5% by volume of H$_2$. Hereinafter, the resulting powder is referred to as "powder P1."

Powder P1 was subjected to Moessbauer spectroscopy. As a result, the percentage of divalent iron in the total iron in powder P1 was found to be 70 at. %.

Powder P1 was also subjected to X-ray diffraction measurement. As a result, it was demonstrated that powder P1 contained the first composite oxide having a spinel structure and the second composite oxide in the same form as δ-, θ-, and α-alumina.

Subsequently, powder P1 was subjected to an endurance test. Specifically, a cycle of exposure to an inert atmosphere for 5 minutes (first period), exposure to an oxidizing atmosphere for 10 minutes (second period), exposure to an inert atmosphere for 5 minutes (third period), and exposure to a reducing atmosphere for 10 minutes (fourth period) was repeated at 1000° C. for 5 hours. Thereafter, powder P1 was cooled to room temperature, keeping it exposed to the reducing atmosphere. The mixed gases having the composition shown in Table 1 below were used as the oxidizing atmosphere, the inert atmosphere and the reducing atmosphere, respectively. The flow rate of each mixed gas was 300×10$^{-3}$ m$^3$/hour.

TABLE 1

| | Oxidizing atmosphere (volume %) | Inert atmosphere (volume %) | Reducing atmosphere (volume %) |
|---|---|---|---|
| H$_2$ | — | — | 0.5 |
| CO | — | — | 1.5 |
| O$_2$ | 1.0 | — | — |
| CO$_2$ | 8.0 | 8.0 | 8.0 |
| H$_2$O | 10 | 10 | 10 |
| N$_2$ | 81 | 82 | 80 |

After the endurance test, powder P1 was subjected to compression molding. The molded product was then crushed so that exhaust gas-purifying catalyst pellets with particle sizes of about 0.5 mm to about 1.0 mm were obtained. Hereinafter, the resulting catalyst is referred to as "catalyst C1."

Example 2

Preparation of Catalyst C2

A powder was prepared as in Example 1, except that commercially available θ-alumina powder having a specific surface area of 100 m$^2$/g was used instead of the γ-alumina powder having a specific surface area of 160 m$^2$/g. Hereinafter, the resulting powder is referred to as "powder P2."

Powder P2 was subjected to Moessbauer spectroscopy. As a result, the percentage of divalent iron in the total iron in powder P2 was found to be 86 at. %.

Powder P2 was also subjected to X-ray diffraction measurement. As a result, the second composite oxide in the same form as θ-alumina and a trace amount of the second composite oxide in the same form as α-alumina were observed.

Figure 3:
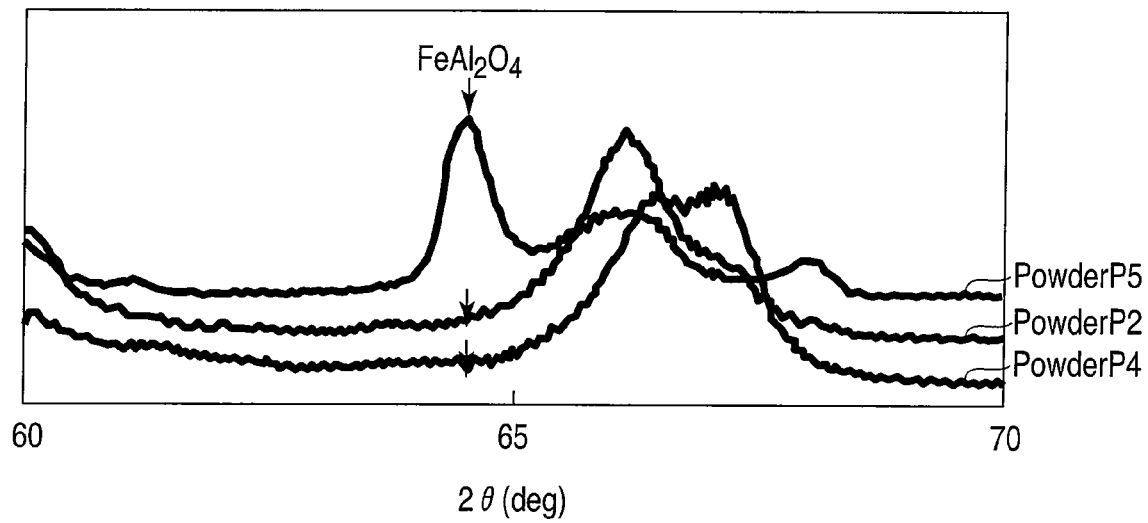
FIG. 3 shows an example of the result of X-ray diffraction measurement.

FIG. 3 shows an example of the result of X-ray diffraction measurement at a diffraction angle 2θ in the range of 60° to 70°. In the graph, the horizontal axis represents the diffraction angle 2θ, and the vertical axis represents the detected intensity. FIG. 3 shows three curves in which one is an X-ray diffraction spectrum obtained for powder P2, and the other two are X-ray diffraction spectra obtained for powders P4 and P5, respectively, which are described below.

The graph shows that the presence of the first composite oxide in powder P2 was not detected by the X-ray diffraction measurement.

Although powder P2 contained a relatively large amount of divalent iron, the presence of the first composite oxide was not detected by the X-ray diffraction measurement. This result suggested that powder P2 contained the first composite oxide in the form of fine particles.

Powder P2 was then subjected to the same endurance test as described in Example 1. Thereafter, powder P2 was formed into pellets, and the pellets were crushed to give an exhaust gas-purifying catalyst. Hereinafter, the resulting catalyst is referred to as "catalyst C2."

Example 3

Preparation of Catalyst C3

A powder was prepared as in Example 1, except that commercially available α-alumina powder having a specific surface area of 5 m$^2$/g was used instead of the γ-alumina powder having a specific surface area of 160 m$^2$/g. Hereinafter, the resulting powder is referred to as "powder P3."

Powder P3 was subjected to Moessbauer spectroscopy. As a result, the percentage of divalent iron in the total iron in powder P3 was found to be 75 at. %.

Powder P3 was also subjected to X-ray diffraction measurement. As a result, it was demonstrated that powder P3 contained the first composite oxide having a spinel structure and the second composite oxide in the same form as α-alumina.

Powder P3 was then subjected to the same endurance test as described in Example 1. Thereafter, powder P3 was formed into pellets, and the pellets were crushed to give an exhaust gas-purifying catalyst. Hereinafter, the resulting catalyst is referred to as "catalyst C3."

Example 4

Preparation of Catalyst C4

A powder was prepared as in Example 1, except that an aqueous iron nitrate solution containing 5% by mass of iron based on the amount of the alumina was used instead of the aqueous iron nitrate solution containing 10% by mass of iron based on the amount of the alumina. Hereinafter, the resulting powder is referred to as "powder P4."

Powder P4 was subjected to Moessbauer spectroscopy. As a result, the percentage of divalent iron in the total iron in powder P4 was found to be 90 at. %.

Powder P4 was also subjected to X-ray diffraction measurement. As a result, O-alumina and the second composite oxide in the same form as O-alumina were observed. As shown in FIG. 3, however, the presence of the first composite oxide was not detected by the X-ray diffraction measurement.

Although powder P4 contained a relatively large amount of divalent iron, the presence of the first composite oxide was not detected by the X-ray diffraction measurement. This result suggested that powder P4 contained the first composite oxide in the form of fine particles as in powder P2.

Powder P4 was then subjected to the same endurance test as described in Example 1. Thereafter, powder P4 was formed into pellets, and the pellets were crushed to give an exhaust gas-purifying catalyst. Hereinafter, the resulting catalyst is referred to as "catalyst C4."

Example 5

Preparation of Catalyst C5

A powder was prepared as in Example 1, except that an aqueous iron nitrate solution containing 20% by mass of iron based on the amount of the alumina was used instead of the aqueous iron nitrate solution containing 10% by mass of iron based on the amount of the alumina. Hereinafter, the resulting powder is referred to as "powder P5."

Powder P5 was subjected to Moessbauer spectroscopy. As a result, the percentage of divalent iron in the total iron in powder P5 was found to be 85 at. %.

Powder P5 was also subjected to X-ray diffraction measurement. The result is shown in FIG. 4.

Figure 4:
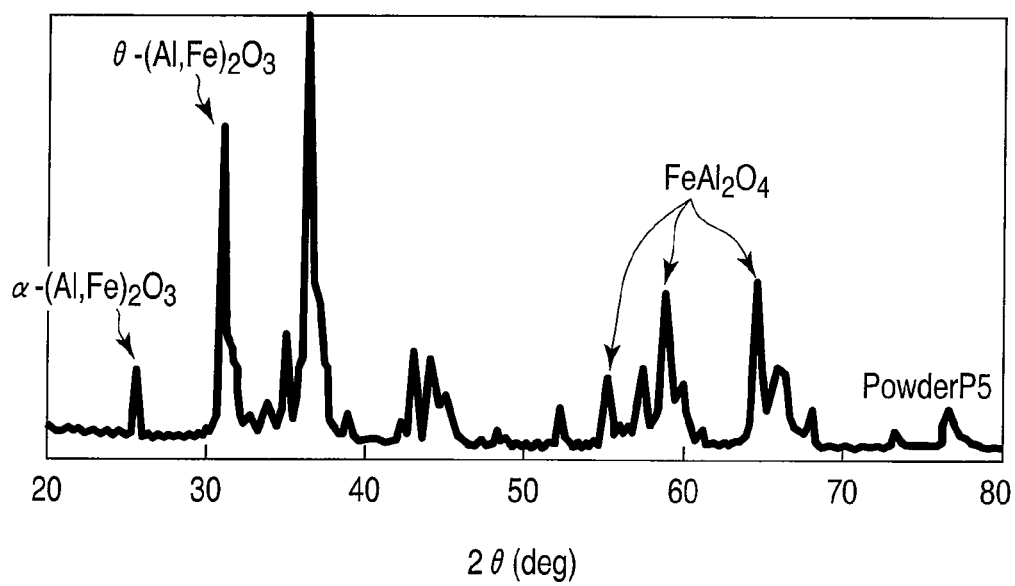
FIG. 4 shows an example of the result of X-ray diffraction measurement.

FIG. 4 shows an example of the result of the X-ray diffraction measurement. In the graph, the horizontal axis represents the diffraction angle 2θ, and the vertical axis represents the detected intensity.

From FIGS. 3 and 4, it was found that powder P5 contained the first composite oxide having a spinel structure and the second composite oxides in the same form as θ- and α-alumina, respectively.

Powder P5 was then subjected to the same endurance test as described in Example 1. Thereafter, powder P5 was formed into pellets, and the pellets were crushed to give an exhaust gas-purifying catalyst. Hereinafter, the resulting catalyst is referred to as "catalyst C5."

Example 6

Preparation of Catalyst C6

A powder was prepared as in Example 1, except that an aqueous iron nitrate solution containing 50% by mass of iron based on the amount of the alumina was used instead of the aqueous iron nitrate solution containing 10% by mass of iron based on the amount of the alumina. Hereinafter, the resulting powder is referred to as "powder P6."

Powder P6 was subjected to Moessbauer spectroscopy. As a result, the percentage of divalent iron in the total iron in powder P6 was found to be 60 at. %.

Powder P6 was also subjected to X-ray diffraction measurement. As a result, it was found that powder P6 contained the first composite oxide having a spinel structure and the second composite oxides in the same form as θ- and α-alumina, respectively.

Powder P6 was then subjected to the same endurance test as described in Example 1. Thereafter, powder P6 was formed into pellets, and the pellets were crushed to give an exhaust gas-purifying catalyst. Hereinafter, the resulting catalyst is referred to as "catalyst C6."

Example 7

Preparation of Catalyst C7

A powder was prepared as in Example 1, except that an aqueous iron nitrate solution containing 1% by mass of iron based on the amount of the alumina was used instead of the aqueous iron nitrate solution containing 10% by mass of iron based on the amount of the alumina. Hereinafter, the resulting powder is referred to as "powder P7."

Powder P7 was subjected to Moessbauer spectroscopy. As a result, the percentage of divalent iron in the total iron in powder P7 was found to be 93 at. %.

Powder P7 was also subjected to X-ray diffraction measurement. As a result, O-alumina was observed, but the presence of the first composite oxide and the second composite oxide in the same form as O-alumina was not detected.

Although powder P7 contained a relatively large amount of divalent iron, the presence of the first and second composite oxides was not detected by the X-ray diffraction measurement. This result suggested that powder P7 contained the first and second composite oxides in the form of fine particles.

Powder P7 was then subjected to the same endurance test as described in Example 1. Thereafter, powder P7 was formed into pellets, and the pellets were crushed to give an exhaust gas-purifying catalyst. Hereinafter, the resulting catalyst is referred to as "catalyst C7."

Example 8

Preparation of Catalyst C8

A powder was prepared as in Example 1, except that an aqueous iron nitrate solution containing 60% by mass of iron based on the amount of the alumina was used instead of the aqueous iron nitrate solution containing 10% by mass of iron based on the amount of the alumina. Hereinafter, the resulting powder is referred to as "powder P8."

Powder P8 was subjected to Moessbauer spectroscopy. As a result, the percentage of divalent iron in the total iron in powder P8 was found to be 40 at. %.

Powder P8 was also subjected to X-ray diffraction measurement. As a result, it was found that powder P8 contained the first composite oxide having a spinel structure and the second composite oxides in the same form as θ- and α-alumina, respectively.

Powder P8 was then subjected to the same endurance test as described in Example 1. Thereafter, powder P8 was formed into pellets, and the pellets were crushed to give an exhaust gas-purifying catalyst. Hereinafter, the resulting catalyst is referred to as "catalyst C8."

Example 9

Preparation of Catalyst C9

An aqueous mixed salt solution was obtained by mixing an aqueous solution containing 0.10 moles (in terms of alumina) of aluminum nitrate, an aqueous iron nitrate solution containing 5% by mass of iron based on the amount of the alumina, and an aqueous cobalt nitrate solution containing 5% by mass of cobalt based on the amount of the alumina. An aqueous solution obtained by dissolving 25.0 g of sodium carbonate in 200 g of deionized water was added dropwise to the aqueous mixed salt solution at room temperature so that the whole amount of aluminum, iron and cobalt was precipitated. The resulting precipitate was separated by filtration, dried at 120° C. and then baked in air at 300° C. for 3 hours. The resulting powder was then pulverized using a mortar. The powder was then baked at 800° C. in air for 1 hour and subsequently baked at 800° C. for 30 minutes in a reducing atmosphere containing 5% by volume of $H_2$. Hereinafter, the resulting powder is referred to as "powder P9."

Powder P9 was subjected to Moessbauer spectroscopy. As a result, the percentage of divalent iron in the total iron in powder P9 was found to be 93 at. %.

Powder P9 was also subjected to X-ray diffraction measurement. As a result, it was found that powder P9 contained the first composite oxide having a spinel structure and the second composite oxide in the same form as alumina.

Powder P9 was then subjected to the same endurance test as described in Example 1. Thereafter, powder P9 was formed into pellets, and the pellets were crushed to give an exhaust gas-purifying catalyst. Hereinafter, the resulting catalyst is referred to as "catalyst C9."

Example 10

Preparation of Catalyst 10

A powder was prepared as in Example 9, except that an aqueous manganese nitrate solution containing 5% by mass of manganese based on the amount of the alumina was used instead of the aqueous cobalt nitrate solution containing 5% by mass of cobalt based on the amount of the alumina. Hereinafter, the resulting powder is referred to as "powder P10."

Powder P10 was subjected to Moessbauer spectroscopy. As a result, the percentage of divalent iron in the total iron in powder P10 was found to be 95 at. %.

Powder P10 was also subjected to X-ray diffraction measurement. As a result, it was found that powder P10 contained the first composite oxide having a spinel structure and the second composite oxide in the same form as alumina.

Powder P10 was then subjected to the same endurance test as described in Example 1. Thereafter, powder P10 was formed into pellets, and the pellets were crushed to give an exhaust gas-purifying catalyst. Hereinafter, the resulting catalyst is referred to as "catalyst C10."

Example 11

Preparation of Catalyst C11

Comparative Example

A spinel-type $MgAl_2O_4$ powder having a specific surface area of 90 $m^2/g$ was obtained by a co-precipitation method using magnesium nitrate and aluminum nitrate. Subsequently, a powder was prepared as in Example 1, except that the spinel-type $MgAl_2O_4$ powder was used instead of the γ-alumina powder. Hereinafter, the resulting powder is referred to as "powder P11."

Powder P11 was subjected to Moessbauer spectroscopy. As a result, the percentage of divalent iron in the total iron in powder P11 was found to be 25 at. %.

Powder P11 was also subjected to X-ray diffraction measurement. As a result, it was found that powder P11 contained $Mg(Al,Fe)_2O_4$ having a spinel structure and a trace amount of α-alumina.

Powder P11 was then subjected to the same endurance test as described in Example 1. Thereafter, powder P11 was formed into pellets, and the pellets were crushed to give an exhaust gas-purifying catalyst. Hereinafter, the resulting catalyst is referred to as "catalyst C11."

Evaluation of Activity of Catalysts C1 to C11

The HC, CO and $NO_x$ conversion efficiencies of each of catalysts C1 to C11 was measured at 450° C. using a model gas containing oxidizing components and reducing components at the concentrations shown in Table 2 below. The weight of each catalyst was 1.0 g, and the flow rate of the model gas was 2.5 L/minute.

TABLE 2

| Gas | CO | $H_2$ | $C_3H_6$ | $C_3H_8$ | $O_2$ | $NO_x$ | $CO_2$ |
|---|---|---|---|---|---|---|---|
| Concentration (volume ppm) | 7000 | 2333 | 500 | 133 | 6700 | 1700 | 80000 |

Table 3 below shows the results of measurement of the HC, CO and $NO_x$ conversion efficiencies of each of catalysts C1 to C11. The results show that each of catalysts C1 to C10 offered higher $NO_x$ conversion performance than catalyst C11.

TABLE 3

| Catalyst | Percentage of divalent iron in the total iron (at. %) | Conversion efficiency at 450° C. | | |
|---|---|---|---|---|
| | | HC | CO | $NO_x$ |
| C1 | 70 | 45 | 46 | 15 |
| C2 | 86 | 60 | 53 | 28 |
| C3 | 75 | 25 | 20 | 13 |
| C4 | 90 | 50 | 32 | 20 |
| C5 | 85 | 48 | 27 | 15 |
| C6 | 60 | 35 | 24 | 10 |
| C7 | 93 | 31 | 22 | 7 |
| C8 | 40 | 27 | 19 | 7 |
| C9 | 93 | 56 | 41 | 22 |
| C10 | 95 | 57 | 45 | 24 |
| C11 (Comparative Example) | 25 | 65 | 55 | 6 |

Figure 5:
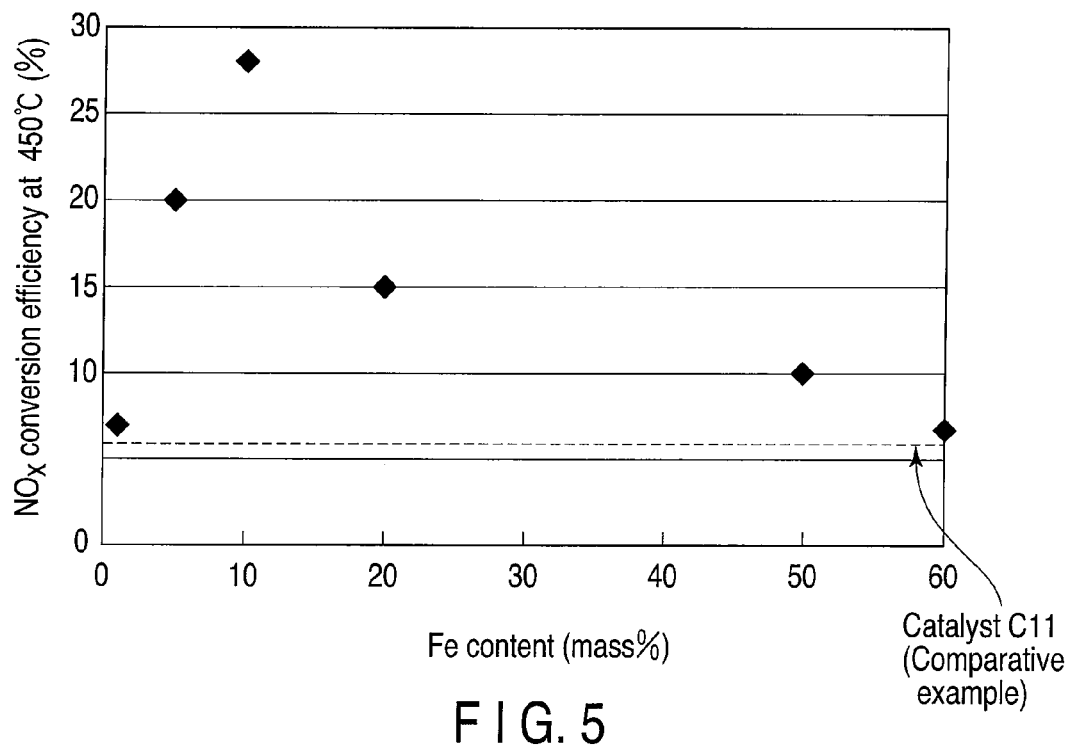
FIG. 5 is a graph showing an example of the relationship between the iron content and the $NO_x$ conversion efficiency at 450° C.

FIG. 5 is a graph showing an example of the relationship between the iron content and the $NO_x$ conversion efficiency at 450° C. In the graph, the horizontal axis represents the content of iron in the whole amount of the catalyst, and the vertical axis represents the $NO_x$ conversion efficiency at 450° C. FIG. 5 is the plot of data obtained for catalysts C2, C4 to C8, and C11.

As shown in FIG. 5, when the content of iron in the whole amount of the catalyst was from 3% by mass to 55% by mass, preferably from 5% by mass to 20% by mass, more preferably from 5% by mass to 15% by mass, particularly high $NO_x$ conversion performance was achieved.

Example 12

Preparation of Catalyst C12 (Reference Example)

A powder was prepared as in Example 2, except that an aqueous iron nitrate solution containing 11% by mass of iron based on the amount of alumina was used instead of the aqueous iron nitrate solution containing 10% by mass of iron based on the amount of alumina. Hereinafter, the resulting powder is referred to as "powder P12."

Powder P12 was subjected to Moessbauer spectroscopy. As a result, the percentage of divalent iron in the total iron in powder P12 was found to be 85 at. %.

Powder P12 was also subjected to X-ray diffraction measurement. As a result, the second composite oxide in the same form as θ-alumina and a trace amount of the second composite oxide in the same form as α-alumina were observed.

Although powder P12 contained a relatively large amount of divalent iron, the presence of the first composite oxide was not detected by the X-ray diffraction measurement. This result suggested that powder P12 contained the first composite oxide in the form of fine particles.

Powder P12 was then subjected to an endurance test. Specifically, a cycle of 5 minutes flow of lean gas produced by adding 5% by volume of oxygen and 10% by volume of water vapor to nitrogen gas (first period) and 5 minutes flow of rich gas produced by adding 10% by volume of carbon monoxide and 10% by volume of water vapor to nitrogen gas (second period) was repeated for 20 hours at a bed temperature of 1050° C. and a flow rate of 1000 mL/minute.

After the endurance test, powder P12 was subjected to compression molding. The molded product was then crushed so that exhaust gas-purifying catalyst pellets with particle sizes of about 0.5 mm to about 1.0 mm were obtained. Hereinafter, the resulting catalyst is referred to as "catalyst C12."

Example 13

Preparation of Catalyst C13 (Reference Example)

A powder was prepared as in Example 9, except that an aqueous iron sulfate solution containing 6% by mass of iron based on the amount of alumina was used instead of the aqueous iron nitrate solution containing 5% by mass of iron based on the amount of alumina and that 28.0 g of sodium carbonate was used instead of 25.0 g of sodium carbonate. Hereinafter, the resulting powder is referred to as "powder P13."

Powder P13 was subjected to Moessbauer spectroscopy. As a result, the percentage of divalent iron in the total iron in powder P13 was found to be 90 at. %.

Powder P13 was also subjected to X-ray diffraction measurement. As a result, it was found that powder P13 contained the first composite oxide having a spinel structure and the second composite oxide in the same form as alumina.

Powder P13 was then subjected to the same endurance test as described in Example 12. Thereafter, powder P13 was formed into pellets, and the pellets were crushed to give an exhaust gas-purifying catalyst. Hereinafter, the resulting catalyst is referred to as "catalyst C13."

Example 14

Preparation of Catalyst C14 (Reference Example)

An aqueous mixed salt solution was obtained by dissolving, in 200 mL of deionized water, magnesium nitrate containing 0.200 moles of magnesium, aluminum nitrate containing 0.340 moles of aluminum, and iron nitrate containing 0.060 moles of iron. An aqueous solution obtained by dissolving 50.0 g of sodium carbonate in 400 mL of deionized water was then added to the aqueous mixed salt solution so that a precipitate was obtained. The precipitate was separated by filtration and then vacuum-dried at 80° C. The product was then heat-treated at 800° C. for 1 hour so that the third composite oxide represented by $MgO.(Al_{1.70}Fe_{0.30}O_3)$ was obtained. Hereinafter, the resulting powder is referred to as "powder P14."

Powder P14 was subjected to X-ray diffraction measurement. As a result, it was found that powder P14 had a spinel structure.

Powder P14 was then subjected to the same endurance test as described in Example 12. Thereafter, powder P14 was formed into pellets, and the pellets were crushed to give an exhaust gas-purifying catalyst. Hereinafter, the resulting catalyst is referred to as "catalyst C14."

Example 15

Preparation of Catalyst C15

Powders P12 and P14 were uniformly mixed in a weight ratio of 9:1 using a mortar. Hereinafter, the resulting powder is referred to as "powder P15."

Powder P15 was then subjected to the same endurance test as described in Example 12. Thereafter, powder P15 was formed into pellets, and the pellets were crushed to give an exhaust gas-purifying catalyst. Hereinafter, the resulting catalyst is referred to as "catalyst C15."

Example 16

Preparation of Catalyst C16

Powders P13 and P14 were uniformly mixed in a weight ratio of 9:1 using a mortar. Hereinafter, the resulting powder is referred to as "powder P16."

Powder P16 was then subjected to the same endurance test as described in Example 12. Thereafter, powder P16 was formed into pellets, and the pellets were crushed to give an exhaust gas-purifying catalyst. Hereinafter, the resulting catalyst is referred to as "catalyst C16."

Example 17

Preparation of Catalyst C17

Powders P12 and P14 were uniformly mixed in a weight ratio of 1:9 using a mortar. Hereinafter, the resulting powder is referred to as "powder P17."

Powder P17 was then subjected to the same endurance test as described in Example 12. Thereafter, powder P17 was formed into pellets, and the pellets were crushed to give an exhaust gas-purifying catalyst. Hereinafter, the resulting catalyst is referred to as "catalyst C17."

Evaluation of Activity of Catalysts C12 to C17

Catalysts C12 to C17 were each weighed in an amount of 1.0 g, and each sample was placed in an atmospheric fixed-bed flow reactor. The sample was then heated from 100 to 500° C. at a rate of 12° C./minute, while model gas having a theoretical air fuel ratio was allowed to flow. In this process, the total hydrocarbon (THC), CO and $NO_x$ conversion efficiencies were continuously measured. Among the results, the THC, CO and $NO_x$ conversion efficiencies at 450° C. are shown in Table 4 below and FIG. 6.

TABLE 4

| Catalyst | Conversion efficiency at 450° C. | | |
| --- | --- | --- | --- |
| | HC | CO | $NO_x$ |
| C12 | 49 | 43 | 24 |
| (Reference Example) | | | |
| C13 | 46 | 37 | 19 |
| (Reference Example) | | | |
| C14 | 62 | 51 | 10 |
| (Reference Example) | | | |
| C15 | 55 | 47 | 24 |
| C16 | 55 | 41 | 19 |
| C17 | 62 | 52 | 15 |

Figure 6:
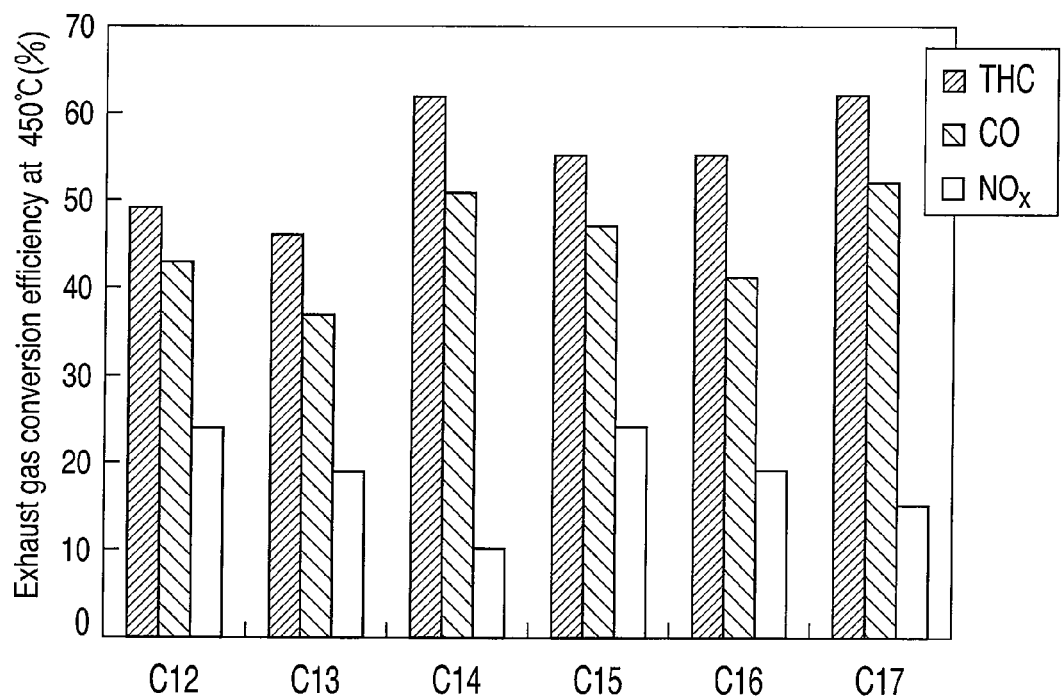
FIG. 6 is a bar graph showing an example of the result of measurement of the THC, CO and $NO_x$ conversion efficiencies at 450° C.

FIG. 6 is a bar graph showing an example of the result of measurement of the THC, CO and $NO_x$ conversion efficiencies at 450° C.

Table 4 and FIG. 6 show that catalysts C12 and C13 each offered higher $NO_x$ conversion performance than catalyst C14 and that catalyst C14 offered higher HC and CO conversion performance than each of catalysts C12 and C13.

Catalyst C15 offered the same $NO_x$ conversion performance as catalyst C12, and higher HC and CO conversion performance than catalyst C12. Therefore, the addition of powder P14 to powder P12 improved the HC and CO conversion performance with no decrease in the $NO_x$ conversion performance.

Similarly, catalyst C16 offered the same $NO_x$ conversion performance as catalyst C13, and higher HC and CO conversion performance than catalyst C13. Therefore, the addition of powder P14 to powder P13 improved the HC and CO conversion performance with no decrease in the $NO_x$ conversion performance.

Catalyst C17 offered the same or higher HC and CO conversion performance as catalyst C14, and higher $NO_x$ conversion performance than catalyst C14. Therefore, the addition of powder P12 to powder P14 improved the $NO_x$ conversion performance with no decrease in the HC and CO conversion performance.

Example 18

Preparation of Catalyst C18

Commercially available θ-alumina powder having a specific surface area of 100 m²/g was introduced into an aqueous iron nitrate solution containing 10% by mass of iron based on the amount of the alumina. The powder was then dried at 120° C. while stirring. The powder was then baked in air at 800° C. for 3 hours so that powder of a solid solution of iron in alumina was obtained. Hereinafter, the resulting powder is referred to as "powder A."

Powder A was then introduced into an aqueous palladium nitrate solution containing 0.5% by mass of palladium based on the amount of powder A. The powder was then dried at 120° C. The powder was then baked in air at 800° C. for 3 hours so that palladium was partially allowed to form a solid solution in powder A. Hereinafter, the resulting powder is referred to as "powder P18."

Subsequently, powder P18 was subjected to an endurance test. Specifically, a cycle of 5 minutes flow of lean gas produced by adding 5% by volume of oxygen and 10% by volume of water vapor to nitrogen gas (first period) and 5 minutes flow of rich gas produced by adding 10% by volume of carbon monoxide and 10% by volume of water vapor to nitrogen gas (second period) was repeated for 20 hours at a bed temperature of 1050° C. and a flow rate of 1000 mL/minute.

After the endurance test, powder P18 was subjected to compression molding. The molded product was then crushed so that exhaust gas-purifying catalyst pellets with particle sizes of about 0.5 mm to about 1.0 mm were obtained. Hereinafter, the resulting catalyst is referred to as "catalyst C18."

Catalyst C18 contained the fourth composite oxide in the same form as θ-alumina. Catalyst C18 had a palladium particle size of 6 nm as determined by CO pulse method.

Example 19

Preparation of Catalyst C19

A powder was prepared in the same manner as described for powder P18, except that an aqueous iron nitrate solution containing 5% by mass of iron based on the amount of the alumina was used instead of the aqueous iron nitrate solution containing 10% by mass of iron based on the amount of the alumina. Hereinafter, the resulting powder is referred to as "powder P19."

Powder P19 was then subjected to the same endurance test as performed on powder P18. Thereafter, powder P19 was formed into pellets, and the pellets were crushed to give an exhaust gas-purifying catalyst. Hereinafter, the resulting catalyst is referred to as "catalyst C19."

Catalyst C19 contained the fourth composite oxide in the same form as θ-alumina. Catalyst C19 had a palladium particle size of 5 nm as determined by CO pulse method.

Example 20

Preparation of Catalyst C20

A powder was prepared in the same manner as described for powder P18, except that an aqueous iron nitrate solution containing 20% by mass of iron based on the amount of the alumina was used instead of the aqueous iron nitrate solution containing 10% by mass of iron based on the amount of the alumina. Hereinafter, the resulting powder is referred to as "powder P20."

Powder P20 was then subjected to the same endurance test as performed on powder P18. Thereafter, powder P20 was formed into pellets, and the pellets were crushed to give an exhaust gas-purifying catalyst. Hereinafter, the resulting catalyst is referred to as "catalyst C20."

Catalyst C20 contained the fourth composite oxides in the same form as θ- and α-alumina. Catalyst C20 had a palladium particle size of 11 nm as determined by CO pulse method.

Example 21

Preparation of Catalyst C21

A powder was prepared in the same manner as described for powder P18, except that γ-alumina powder having a specific surface area of 160 m²/g was used instead of the θ-alumina powder having a specific surface area of 100 m²/g. Hereinafter, the resulting powder is referred to as "powder P21."

Powder P21 was then subjected to the same endurance test as performed on powder P18. Thereafter, powder P21 was formed into pellets, and the pellets were crushed to give an exhaust gas-purifying catalyst. Hereinafter, the resulting catalyst is referred to as "catalyst C21."

Catalyst C21 contained the fourth composite oxides in the same form as δ-, α- and θ-alumina. Catalyst C21 had a palladium particle size of 8 nm as determined by CO pulse method.

Example 22

Preparation of Catalyst C22

A powder was prepared in the same manner as described for powder P18, except that an aqueous iron nitrate solution containing 0.1% by mass of iron based on the amount of the alumina was used instead of the aqueous iron nitrate solution containing 10% by mass of iron based on the amount of the alumina. Hereinafter, the resulting powder is referred to as "powder P22."

Powder P22 was then subjected to the same endurance test as performed on powder P18. Thereafter, powder P22 was formed into pellets, and the pellets were crushed to give an exhaust gas-purifying catalyst. Hereinafter, the resulting catalyst is referred to as "catalyst C22."

Catalyst C22 contained the fourth composite oxide in the same form as θ-alumina. Catalyst C22 had a palladium particle size of 14 nm as determined by CO pulse method.

Example 23

Preparation of Catalyst C23

A powder was prepared in the same manner as described for powder P18, except that an aqueous iron nitrate solution containing 30% by mass of iron based on the amount of the alumina was used instead of the aqueous iron nitrate solution containing 10% by mass of iron based on the amount of the alumina. Hereinafter, the resulting powder is referred to as "powder P23."

Powder P23 was then subjected to the same endurance test as performed on powder P18. Thereafter, powder P23 was formed into pellets, and the pellets were crushed to give an exhaust gas-purifying catalyst. Hereinafter, the resulting catalyst is referred to as "catalyst C23."

Catalyst C23 contained the fourth composite oxides in the same form as θ- and α-alumina. Catalyst C23 had a palladium particle size of 14 nm as determined by CO pulse method.

Example 24

Preparation of Catalyst C24

An aqueous mixed salt solution was obtained by mixing an aqueous solution containing 0.10 moles (in terms of alumina) of aluminum nitrate and an aqueous iron nitrate solution containing 10% by mass of iron based on the amount of the alumina. An aqueous solution prepared by dissolving 25.0 g of sodium carbonate in 200 g of deionized water was added dropwise to the aqueous mixed salt solution at room temperature so that the whole amount of aluminum and iron was precipitated. The resulting precipitate was separated by filtration, dried at 120° C. and then baked in air at 300° C. for 3 hours. The resulting powder was then pulverized using a mortar. The powder was then baked in air at 800° C. for 3 hours so that alumina powder containing an iron solid solution was obtained. Hereinafter, the resulting powder is referred to as "powder B."

A powder was prepared in the same manner as described for powder P18, except that powder B was used instead of powder A. Hereinafter, the resulting powder is referred to as "powder P24."

Powder P24 was then subjected to the same endurance test as performed on powder P18. Thereafter, powder P24 was formed into pellets, and the pellets were crushed to give an exhaust gas-purifying catalyst. Hereinafter, the resulting catalyst is referred to as "catalyst C24."

Catalyst C24 contained the fourth composite oxide in the same form as alumina. Catalyst C24 had a palladium particle size of 4 nm as determined by CO pulse method.

Example 25

Preparation of Catalyst C25

A powder was prepared in the same manner as described for powder P24, except that an aqueous cobalt nitrate solution containing 10% by mass of cobalt based on the amount of the alumina was used instead of the aqueous iron nitrate solution containing 10% by mass of iron based on the amount of the alumina. Hereinafter, the resulting powder is referred to as "powder P25."

Powder P25 was then subjected to the same endurance test as performed on powder P18. Thereafter, powder P25 was formed into pellets, and the pellets were crushed to give an exhaust gas-purifying catalyst. Hereinafter, the resulting catalyst is referred to as "catalyst C25."

Catalyst C25 contained the fourth composite oxide in the same form as alumina. Catalyst C25 had a palladium particle size of 7 nm as determined by CO pulse method.

Example 26

Preparation of Catalyst C26

Comparative Example

Commercially available θ-alumina powder having a specific surface area of 100 m²/g was introduced into an aqueous palladium nitrate solution containing 0.5% by mass of palladium based on the amount of the alumina. The powder was then dried at 120° C. The powder was then baked in air at 600° C. for 1 hour. Hereinafter, the resulting powder is referred to as "powder P26."

Powder P26 was then subjected to the same endurance test as performed on powder P18. Thereafter, powder P26 was formed into pellets, and the pellets were crushed to give an exhaust gas-purifying catalyst. Hereinafter, the resulting catalyst is referred to as "catalyst C26."

Catalyst C26 did not contain a significant amount of a composite oxide and contained O-alumina as the main component. Catalyst C26 had a palladium particle size of 15 nm as determined by CO pulse method.

Evaluation of Solid Solution Forming Ratio of palladium in powders P18 to P26

Powders P18 to P26 were each sampled, and the samples were each left for 12 hours in an aqueous 10% hydrogen fluoride solution at room temperature. These conditions are such that only the composite oxides in the powders can be dissolved. Subsequently, the resulting solution was filtered, and the filtrate was subjected to inductively coupled high-frequency plasma (ICP) spectroscopic analysis. The Solid Solution Forming Ratio of palladium in each of powders P18 to P26 was measured as described above.

The results are summarized in the table below together with the physical properties of catalysts C18 to C26.

TABLE 5

| Catalyst | Solid solution forming ratio | Crystal phase | Fe or Co content (mass %) | Pd content (mass %) | Pd particle diameter after the endurance (nm) | 50% conversion temperature (° C.) | | |
|---|---|---|---|---|---|---|---|---|
| | | | | | | THC | CO | $NO_x$ |
| C18 | 60 | θ-$(Al,Fe)_2O_3$ | 10 | 0.5 | 6 | 269 | 259 | 273 |
| C19 | 40 | θ-$(Al,Fe)_2O_3$ | 5 | 0.5 | 5 | 300 | 278 | 310 |

TABLE 5-continued

| Catalyst | Solid solution forming ratio | Crystal phase | Fe or Co content (mass %) | Pd content (mass %) | Pd particle diameter after the endurance (nm) | 50% conversion temperature (° C.) | | |
|---|---|---|---|---|---|---|---|---|
| | | | | | | THC | CO | $NO_x$ |
| C20 | 55 | θ-(Al,Fe)$_2$O$_3$<br>α-(Al,Fe)$_2$O$_3$ | 20 | 0.5 | 11 | 308 | 282 | 315 |
| C21 | 65 | δ-(Al,Fe)$_2$O$_3$<br>θ-(Al,Fe)$_2$O$_3$<br>α-(Al,Fe)$_2$O$_3$(trace) | 10 | 0.5 | 8 | 302 | 280 | 315 |
| C22 | 12 | θ-Al$_2$O$_3$ | 0.1 | 0.5 | 14 | 310 | 290 | 327 |
| C23 | 45 | θ-(Al, Fe)$_2$O$_3$<br>α-(Al,Fe)$_2$O$_3$ | 30 | 0.5 | 14 | 311 | 287 | 328 |
| C24 | 70 | (Al,Fe)$_2$O$_3$ | 10 | 0.5 | 4 | 260 | 251 | 262 |
| C25 | 50 | (Al,Co)$_2$O$_3$ | 10 | 0.5 | 7 | 273 | 264 | 290 |
| C26 (Comparative Example) | 0 | θ-Al$_2$O$_3$ | 0 | 0.5 | 15 | 312 | 291 | 329 |

FIG. 7 is a graph showing an example of the result of measurement by X-ray photoelectron spectroscopy (XPS). In the graph, the horizontal axis represents the bond energy, and the vertical axis represents the detected intensity. FIG. 7 shows two curves in which one is an XPS spectrum obtained for powder P18, and the other is an XPS spectrum obtained for powder P26.

As shown in FIG. 7, the XPS spectrum obtained for powder P26 has a peak at a position corresponding to the Pd—O bond. On the other hand, the XPS spectrum obtained for powder P18 has a peak at a position away from the position corresponding to the Pd—O bond, which indicates that a considerable amount of palladium forms a solid solution in the composite oxide.

Evaluation of Activity of Catalysts C18 to C26

Catalysts C18 to C26 were each placed in an atmospheric fixed-bed flow reactor. Each catalyst was then heated from 100 to 500° C. at a rate of 12° C./minute, while model gas having a theoretical air fuel ratio was allowed to flow. In this process, the THC, CO and $NO_x$ conversion efficiencies were continuously measured, and the temperature at which 50% of each gas was converted (hereinafter referred to as the 50% conversion temperature) was determined. The results are shown in Table 5 above.

As shown in Table 5, catalysts C18 to C25 each achieved a higher exhaust gas purification capability than catalyst C26.

FIG. 8 is a graph showing an example of the relationship between the iron content and the $NO_x$ 50% conversion temperature. In the graph, the horizontal axis represents the iron content, and the vertical axis represents the $NO_x$ 50% conversion temperature. FIG. 8 is the plot of data obtained for catalysts C18 to C20, C22 to C24, and C26.

As shown in FIG. 8, when the iron content was in the range of 5 to 20% by mass, particularly high $NO_x$ conversion performance was achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An exhaust gas-purifying catalyst, comprising:
   at least one of a first composite oxide represented by formula A(Al$_{2-x}$B$_x$)O$_4$ and a second composite oxide represented by a formula (Al$_{2-y}$C$_y$)O$_3$; and
   a third composite oxide represented by a formula D$_i$O$_j$·p (E$_{2-z}$Fe$_z$O$_3$),
   wherein element A is a divalent transition metal other than platinum-group elements,
   each of elements B and C is a transition metal other than platinum-group elements,
   element D is at least one element selected from the group consisting of a monovalent element, a divalent element and a rare-earth element,
   element E is aluminum or a combination of aluminum and a transition metal,
   x satisfies 0<x<2,
   y satisfies 0<y<2,
   i and j are numbers that satisfy ki=2j when the valence of the element D is k,
   p satisfies 1≦p≦6, and
   z satisfies 0≦z≦2.

2. The exhaust gas-purifying catalyst according to claim 1, wherein the element D is at least one element selected from the group consisting of an alkali metal, an alkaline-earth metal and a rare-earth element.

3. The exhaust gas-purifying catalyst according to claim 1, wherein the element D is magnesium.

4. The exhaust gas-purifying catalyst according to claim 1, wherein the element E is aluminum.

5. An exhaust gas-purifying catalyst, comprising:
   a composite oxide represented by a formula (Al$_{2-y}$C$_y$)O$_3$,
   wherein the element C is iron or a combination of iron and other transition metal other than platinum-group elements, and
   y satisfies 0<y<2.

6. An exhaust gas-purifying catalyst, comprising:
   a composite oxide represented by a formula (Al$_{2-y}$C$_y$)O$_3$,
   wherein the element C is a transition metal other than platinum-group elements, and
   y satisfies 0<y<2; and
   wherein composite oxide contains iron, and the percentage of divalent iron in the total iron in the composite oxide is 30 at. % or more.

7. An exhaust gas-purifying catalyst, comprising:
   a composite oxide represented by a formula (Al$_{2-y}$C$_y$)O$_3$, and
   palladium, wherein the composite oxide and a part of the palladium form a solid solution, and
   a composite oxide represented by a formula CAl$_2$O$_4$ and having a spinel structure, wherein the element C is a transition metal other than platinum-group elements, and capable of being divalent and trivalent, and y satisfies $0<y<2$.

8. An exhaust gas-purifying catalyst, comprising:

a composite oxide represented by a formula $(Al_{2-y}C_y)O_3$, and palladium, wherein the composite oxide and a part of the palladium form a solid solution, wherein the element C is iron or a combination of iron and at least one other element having an outermost shell electron in a 3d orbital other than platinum-group elements, and capable of being divalent and trivalent, and y satisfies $0<y<2$.

* * * * *